United States Patent

[11] 3,589,292

| [72] | Inventors | Ralph W. Hanson<br>Minneapolis;<br>Norman H. Hoffman, Eden Prairie, both of, Minn. |
|---|---|---|
| [21] | Appl. No. | 759,809 |
| [22] | Filed | Aug. 1, 1968 |
| [45] | Patented | June 29, 1971 |
| [73] | Assignee | Technical Ordnance, Inc.<br>Minneapolis, Minn. |

[54] METHOD FOR FORMING TERMINAL COVERING FOR FUSES AND PRODUCT
2 Claims, 8 Drawing Figs.

| [52] | U.S. Cl. | 102/27 R, 102/70 R |
|---|---|---|
| [51] | Int. Cl. | F42c 19/08 |
| [50] | Field of Search | 86/1; 102/27—29, 70 |

[56] References Cited

UNITED STATES PATENTS

| 405,646 | 6/1889 | Zalinski et al. | 102/28 |
|---|---|---|---|
| 991,373 | 5/1911 | Rennie et al. | 102/28 |
| 3,238,873 | 3/1966 | Allen | 102/27 |
| 3,241,489 | 3/1966 | Andrews et al. | 102/27 |

FOREIGN PATENTS

| 725,516 | 3/1955 | Great Britain | 102/27 |
|---|---|---|---|

*Primary Examiner*—Verlin R. Pendegrass
*Attorney*—Reif and Gregory

ABSTRACT: A method for grouping end portions of a plurality of detonating or deflagrating fuses and securing the same together by the application of low point ignition solder to incase said end portions and shape said solder into a desired outer configuration to form a terminal covering as for connection with an ignition means.

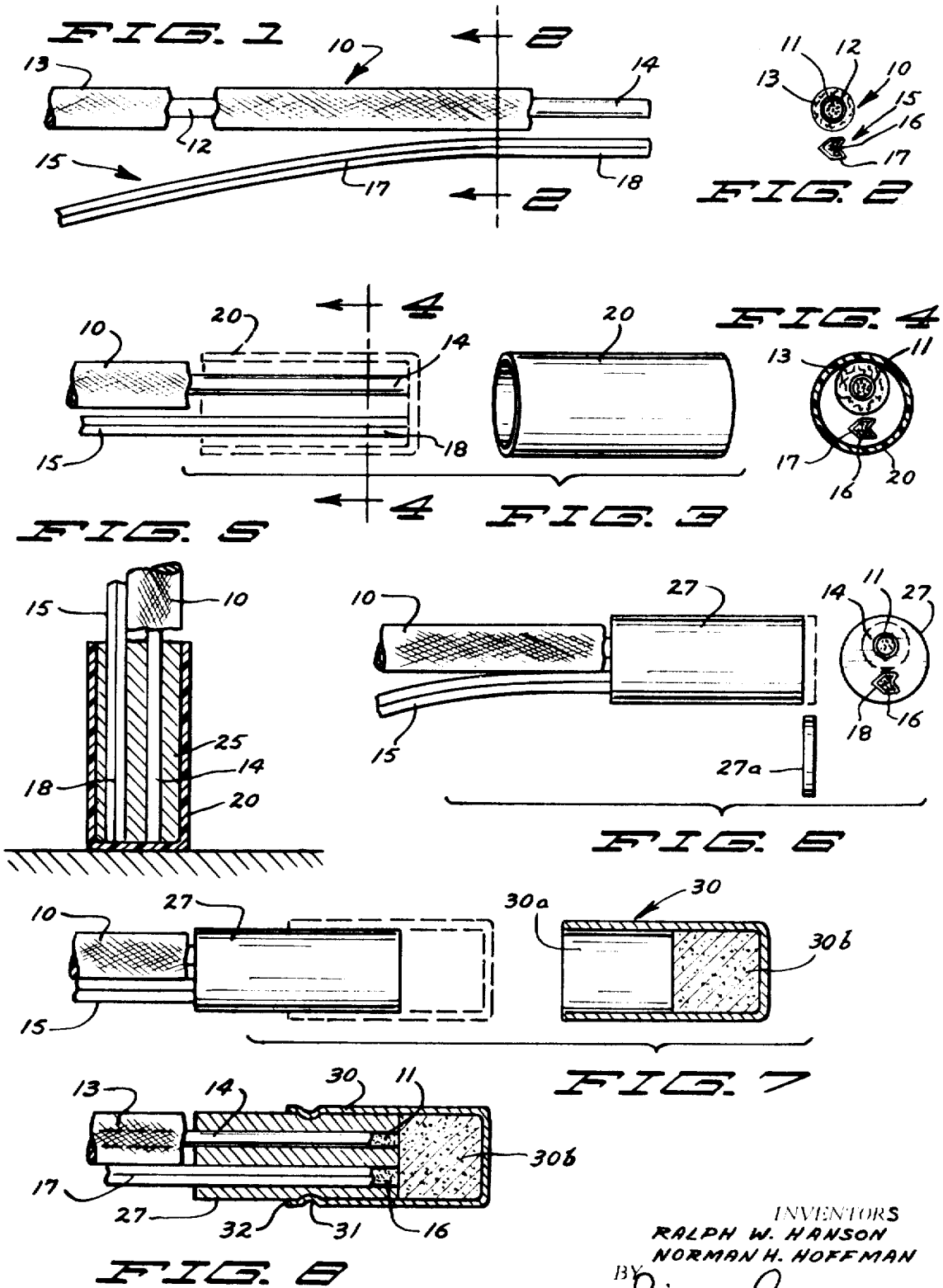

METHOD FOR FORMING TERMINAL COVERING FOR FUSES AND PRODUCT

BACKGROUND AND SUMMARY OF THE INVENTION

It is not an uncommon practice to employ the use of a plurality of detonating or deflagrating lines such as fuses or cords which may extend in various directions and which will have a common connection to an ignition means.

Detonating and deflagrating fuses have various cross-sectional configurations and generally do not have surfaces which would nest or mate with one another for purpose of grouping end portions of the same. It is a common practice to use a resilient grommet to encase or hold together end portions of fuses and to connect them with an ignition means. This use of such a grommet does not provide either a secure holding means or a sealed connection.

It is desirable to have end portions of fuses secured and sealed together by a unitary bond and to have a desired common outer configuration for a convenient connection or union with an ignition or explosive means such as a booster cup whereby all of the fuses thus joined will be ignited or detonated at one and the same time.

Generally described, the method herein provides for assembling or grouping end portions of detonating or deflagrating lines such as fuses or cords to form a common end or terminal portion, the surfaces of said end portions will first have been prepared for the application of solder having a suitably low melting point, incasing said end portions with said solder and shaping said solder to have a desired outer configuration and exposing the end surfaces of the cores of said connected end portions for connection with a common ignition means.

It is an object therefore of this invention to provide means for positively securing together grouped or adjacent end portions of a plurality of detonating or deflagrating lines such as fuses or cords for connection with a common ignition means.

It is another object of this invention to cause a plurality of end portions of detonating or deflagrating fuses to have a desired common outer configuration for connection with a single ignition means of a given configuration.

It is more specifically an object of this invention to provide a relatively simple method to hermetically seal together grouped or adjacent end portions of fuses to form a unitary common terminal for connection with an ignition means such as a booster cup.

It is also an object of this invention to provide a hermetically sealed covering for a terminal or end portion of a detonating or deflagrating line.

It is also an object of this invention to provide a product consisting of a plurality of detonating or deflagrating lines having their respective end portions grouped for retention in a hermetically sealed terminal housing of solder.

These and other objects and advantages of the invention will be set forth in the following description made in connection with the accompanying drawings in which like reference characters refer to similar parts throughout the several views and in which:

FIG. 1 is a broken view in elevation;

FIG. 2 is a view in vertical section taken on line 2-2 of FIG. 1 as indicated;

FIG. 3 is a composite partially broken view in elevation with a portion thereof shown in dotted line in an operating position;

FIG. 4 is a view in vertical section taken on line 4-4 of FIG. 3, as indicated;

FIG. 5 is a broken view in vertical section;

FIG. 6 is a composite partially broken view in side and end elevation with a dotted line showing a removed portion thereof;

FIG. 7 is a broken composite view partially in elevation and partially in vertical section with the latter portion being shown by dotted line in operating position; and FIG. 8 is a broken view in vertical section.

DESCRIPTION OF A PREFERRED EMBODIMENT

Detonating fuses or cords of various kinds are in use in which the core is within a lead sheath and a reinforcing covering may be placed about the lead sheath. The fuses may be round in cross section to provide a linear or axial direction of travel for the detonation waves or said fuses may have a V-shaped or a U-shaped configuration in cross section to provide both linear and transverse direction of travel for the detonation waves therethrough.

Throughout the description herein, the term "detonating fuse" will be used to apply generally to the use of either detonating or deflagrating lines.

Referring to the drawings, a circular detonating fuse 10 is shown having a core 11 with a lead sheath 12 thereabout. Also shown is a detonating fuse 15, V-shaped in cross section having a core 16 with a lead sheath 17 thereabout. These are shown as examples of typical fuses.

It is desirable to have said fuses joined or grouped to have a hermetic common terminal or end seal for ignition purposes. It will be understood that the number of such fuses which may be joined or grouped together is a matter of choice.

Said fuse 10 is shown having a reinforcing covering 13 over its lead sheathing which in the present embodiment is indicated as being a braided material. Said fuse 15 is shown having no covering over its lead sheath 17. Said covering 13 is removed or peeled back from the end portion 14 to expose the lead sheathing 12. The end portion of fuse 15 is indicated by the reference numeral 18. Said end portions of said fuses by being cleaned as with the application of sanding paper, are prepared for an application of an appropriate flux which is not here shown.

Said end portions 14 and 18 will next be held by any suitable means in a substantially side by side relation adjacent one another. In the present embodiment said end portions are shown disposed in retaining member or receptacle 20 here shown in the form of a cup which will be made of any suitable material to which solder will not adhere. Said end portions preferably will be centered within said cup.

Next, solder 25 in a molten state will be applied to said end portions by being poured into said cup. Said solder will have a low melting point such that it will be lower than the lowest ignition point of the core material of the detonating fuses. It is generally desirable to have a circular terminal covering configuration with respect to the solder being applied to said end portions. Said cup will be filled with said solder to form the covering connector and sealing member 27 which becomes fused with said end portions and which then will be removed from said cup. Upon occasion, it may become necessary to deform the end portions of said fuses to confine them within a desired outer configuration as within said cup. This is readily accomplished by the application of suitable compression to the lead sheathing comprising said end portions.

It will be understood that although a cup is herein indicated as a receptacle to hold the end portions of the fuses for the application of solder, solder may also be readily applied to form a terminal covering by dipping said end portions into a receptacle of prepared solder or by applying solder as in layers to incase said end portions.

With the removal of the cup 20, the end portions 14 and 18 of said fuses are hermetically sealed with respect to the cores therein.

In putting said fuses to use, an ignition means will be connected to said terminal or covering connector 27. Here said ignition means is shown in the form of a booster cup 30.

Prior to the connection of said booster cup the core ends must be exposed and this is here indicated as being conveniently accomplished by having a thin cross sectional slice of material 27a removed from the free end of said terminal connector 27.

Said booster cup forms a receptacle 30a at its open end portion and carries an ignition or explosive charge 30b at its closed end portion. The terminal connector 27 is partially received within said portion 30a and said booster cup is here shown received about said connector as by crimping as indicated at 31, and by the application of a solder seal indicated at 32 for a secure hermetic seal.

It will be understood that the scope of the invention herein also embraces a grouping of fuse end portions such as containing the same spaced about an annular ring of solder which will have a central cavity to contain or hold the ignition or explosive charge. Such an arrangement may be referred to as a spider arrangement differing only in detail from the embodiment herein described in connection with forming a cylindrical terminal housing. Here said end portions are disposed radially with respect to their grouping with adjacent of said end portions having a side-by-side relation.

Thus as above set forth, a relatively simple method with a resulting product is provided with respect to assembling and hermetically securing within a unitary and sealed terminal housing or connector the end portions of fuses for use in connection with one another, all to be detonated or deflagrated by a common means.

We claim:

1. The method of incasing a plurality of end portions of fuses to hermetically seal the same consisting of the steps of
    taking the end portions of more than one fuse,
    treating said end portions with flux,
    arranging said end portions in desired grouping relative to one another, and
    applying molten solder to said end portions for fusion therewith to form a hermetic sealing covering incasing said end portions, said solder having a melting point below the ignition point of the core material of said fuses.
2. The method set forth in claim 1, including
    removing the end portion of said sealing covering to expose the end surfaces of said fuses, and
    attaching an ignition means formed as a receptacle incasing said end portion of said covering.